United States Patent
Cui et al.

(10) Patent No.: US 10,061,993 B2
(45) Date of Patent: Aug. 28, 2018

(54) WARNING METHOD OF OBSTACLES AND DEVICE OF OBSTACLES

(71) Applicant: Beijing Smarter Eye Technology Co. Ltd., Beijing (CN)

(72) Inventors: Feng Cui, Beijing (CN); Haitao Zhu, Beijing (CN); Ran Meng, Beijing (CN); Qiwei Xie, Beijing (CN); An Jiang, Beijing (CN)

(73) Assignee: BEIJING SMARTER EYE TECHNOLOGY CO. LTD., Beijing (CN)

( * ) Notice: Subject to any disclaimer, the term of this patent is extended or adjusted under 35 U.S.C. 154(b) by 4 days.

(21) Appl. No.: 15/465,343

(22) Filed: Mar. 21, 2017

(65) Prior Publication Data
US 2017/0337434 A1    Nov. 23, 2017

(30) Foreign Application Priority Data
Jan. 22, 2016 (CN) .......................... 2016 1 0044507

(51) Int. Cl.
| G06K 9/00 | (2006.01) |
| G08G 1/16 | (2006.01) |
| G06T 7/246 | (2017.01) |
| G06K 9/66 | (2006.01) |
| G01P 3/64 | (2006.01) |

(52) U.S. Cl.
CPC ............ *G06K 9/00805* (2013.01); *G01P 3/64* (2013.01); *G06K 9/66* (2013.01); *G06T 7/248* (2017.01); *G08G 1/16* (2013.01); *G06T 2207/10012* (2013.01); *G06T 2207/10044* (2013.01); *G06T 2207/20081* (2013.01); *G06T 2207/30261* (2013.01)

(58) Field of Classification Search
None
See application file for complete search history.

*Primary Examiner* — Stephen Coleman
(74) *Attorney, Agent, or Firm* — Novick, Kim & Lee, PLLC; Allen Xue

(57) ABSTRACT

An obstacle warning method includes the steps of: acquiring scenario images at a current sampling time and a previous sampling time, and a map about first relative distances between respective viewing points in a viewing field and a vehicle; acquiring a profile and marking information of an obstacle and a map about a second relative distance between the obstacle and the vehicle in accordance with the map about the first relative distances; calculating a map about a third relative distance between the obstacle and the vehicle at a previous sampling time in accordance with the map about the first relative distances at the previous sampling time, the profile and the marking information of the obstacle at the current sampling time and a motion vector of the obstacle from the current sampling time to the previous sampling time.

9 Claims, 3 Drawing Sheets

| acquiring a first scenario image at a current sampling time, a second scenario image at a previous sampling time, and a map about first relative distances between respective viewing points in a viewing field and the vehicle | S100 |

| dividing and marking an obstacle in the first scenario image in accordance with the map about the first relative distances so as to acquire a profile and marking information of the obstacle, and weighted-averaging first distances in the profile so as to acquire a map about a second relative distance between the obstacle and the vehicle | S110 |

| calculating a motion vector of the obstacle from the current sampling time to the previous sampling time in accordance with the first scenario image and the second scenario image | S120 |

| matching the marked obstacle acquired at the current sampling time with the corresponding obstacle acquired at the previous sampling time in accordance with the profile, the marking information and the motion vector, and calculating a map about a third relative distance between the obstacle and the vehicle at the previous sampling time in accordance with the profile of the obstacle at the previous sampling time and the map about the first relative distances between the respective viewing points and the vehicle at the previous sampling time | S130 |

| calculating a change value of a relative distance between the obstacle and the vehicle at the current sampling time and the previous sampling time in accordance with the map about the second relative distance and the map about the third relative distance, and calculating a speed of the obstacle relative to the vehicle at the current sampling time in accordance with the change value of the relative distance and an interval between the current sampling time and the previous sampling time | S140 |

| determining a collision time when the obstacle acquired at the current sampling time is to collide with the vehicle in accordance with the map about the second relative distance, the profile of the obstacle and the speed of the obstacle relative to the vehicle, and sending an obstacle warning in accordance with the collision time | S150 |

Fig.1

WARNING METHOD OF OBSTACLES AND DEVICE OF OBSTACLES

TECHNICAL FIELD

The present disclosure relates to the field of pattern recognition, machine learning and video image processing technology, in particular to an obstacle warning method.

BACKGROUND

Currently, in the case of measuring a distance between an obstacle and a vehicle such as automobile, robot and unmanned aerial vehicle, a monocular vision technique has such detects as low accuracy, high missing rate and high misreporting rate, as compared with a radar distance-measurement technique and a binocular vision distance-measurement technique.

In the case of acquiring a speed of the obstacle relative to the vehicle, it is necessary to track and match depths of the obstacle measured twice, so as to acquire a correspondence between two pieces of sampling data of the same obstacle. For a conventional obstacle tracking algorithm, it is necessary to perform feature point matching and obstacle division on obstacle information acquired by two sampling operations. A feature point matching scheme, no matter on the basis of a depth map or an image, has such defects as large computation burden and low accuracy. Hence, it is impossible for the conventional algorithm to accurately determine the obstacle.

SUMMARY

A main object of the present disclosure is to provide an obstacle warning method, so as to determine the obstacle in a quick and accurate manner.

The present disclosure provides in some embodiments an obstacle warning method for an obstacle avoidance and path planning system of a vehicle, at least including steps of: acquiring a first scenario image at a current sampling time, a second scenario image at a previous sampling time, and a map about first relative distances between respective viewing points in a viewing field and the vehicle; dividing and marking an obstacle in the first scenario image in accordance with the map about the first relative distances so as to acquire a profile and marking information of the obstacle, and weighted-averaging first distances in the profile so as to acquire a map about a second relative distance between the obstacle and the vehicle; calculating a motion vector of the obstacle from the current sampling time to the previous sampling time in accordance with the first scenario image and the second scenario image; matching the marked obstacle acquired at the current sampling time with the corresponding obstacle acquired at the previous sampling time in accordance with the profile, the marking information and the motion vector, and calculating a map about a third relative distance between the obstacle and the vehicle at the previous sampling time in accordance with the profile of the obstacle at the previous sampling time and the map about the first relative distances between the respective viewing points and the vehicle at the previous sampling time; calculating a change value of a relative distance between the obstacle and the vehicle at the current sampling time and the previous sampling time in accordance with the map about the second relative distance and the map about the third relative distance, and calculating a speed of the obstacle relative to the vehicle at the current sampling time in accordance with the change value of the relative distance and an interval between the current sampling time and the previous sampling time; and determining a collision time when the obstacle acquired at the current sampling time is to collide with the vehicle in accordance with the map about the second relative distance, the profile of the obstacle and the speed of the obstacle relative to the vehicle, and sending an obstacle warning in accordance with the collision time.

It should be appreciated that, the summary is not intended to include all necessary technical features of the subject matters to be protected in the embodiments of the present disclosure, nor to define a scope of the present disclosure. The subject matters to be protected in the embodiments of the present disclosure are not limited to overcome any or all defects mentioned in the background.

BRIEF DESCRIPTION OF THE DRAWINGS

The following drawings are provided to facilitate the understanding of the present disclosure, and constitute a portion of the description. These drawings and the following embodiments are for illustrative purposes only, but shall not be construed as limiting the present disclosure. Obviously, the following drawings merely relate to some embodiments of the present disclosure, and based on these drawings, a person skilled in the art may obtain the other drawings without any creative effort. In these drawings, FIG. 1 is a flow chart of an obstacle warning method according to one embodiment of the present disclosure;

Figure 2:
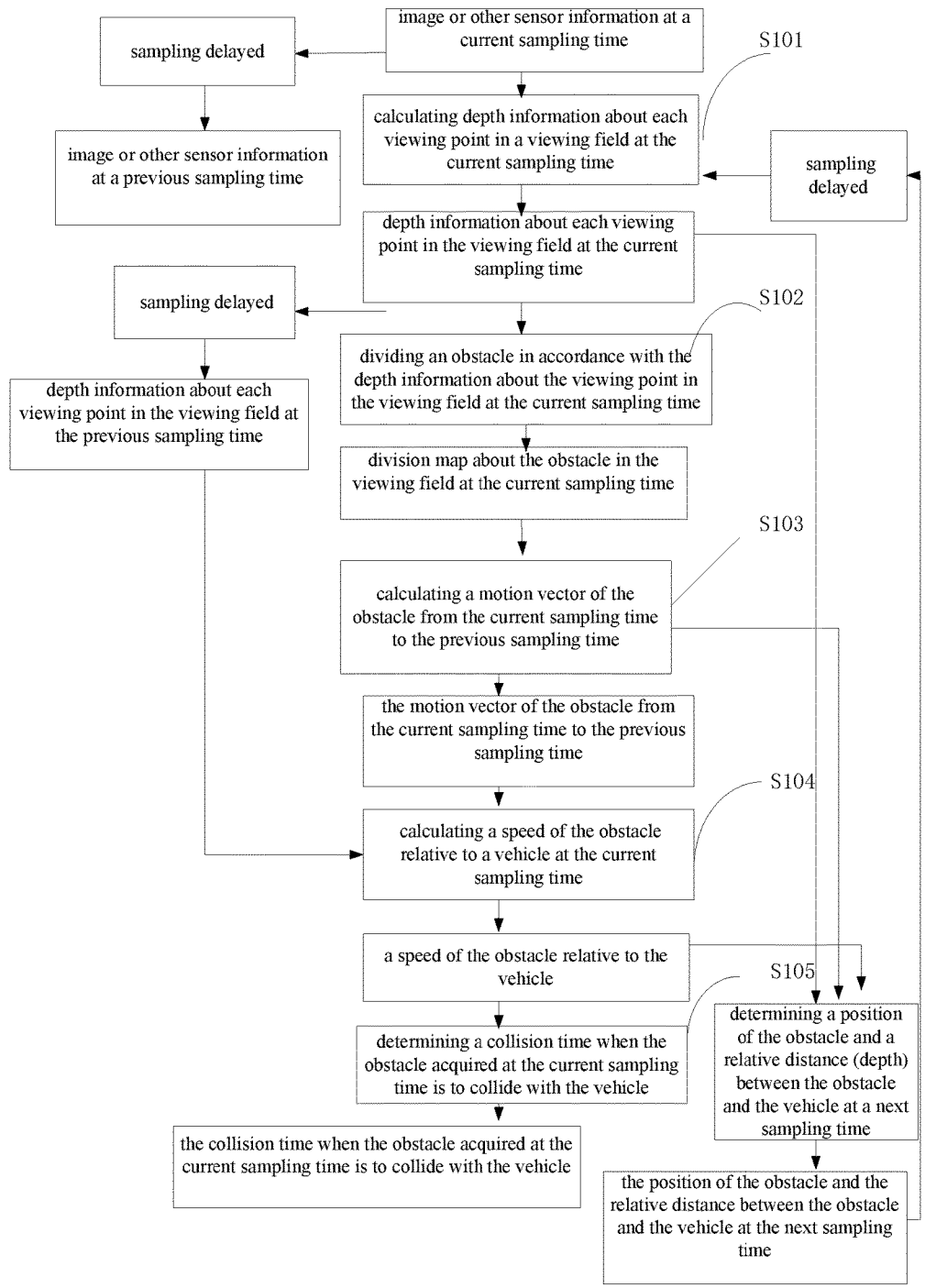
FIG. 2 is another flow chart of the obstacle warning method according to one embodiment of the present disclosure.

These drawings and the descriptions thereof are not intended to limit a scope of the present disclosure in any way, and instead, a concept of the present disclosure may be apparent with reference to specific embodiments.

DETAILED DESCRIPTION

In order to make the objects, the technical solutions and the advantages of the present disclosure more apparent, the present disclosure will be described hereinafter in a clear and complete manner in conjunction with the drawings and embodiments.

As shown in FIG. 1, the present disclosure provides in some embodiments an obstacle warning method for an obstacle avoidance and path planning system of a vehicle. The obstacle warning method may include Steps S100 to S150.

Step S100: acquiring scenario images at a current sampling time and a previous sampling time, and a map about first relative distances between respective viewing points in a viewing field and the vehicle.

In this step, the map about the relative distances between the respective viewing points and the vehicle is just a depth information map, and it may be acquired through, but not limited to, a binocular vision distance-measurement method and a radar distance-measurement method. During the actual application, the relative distances between each viewing point in the viewing field and the vehicle at the current sampling time and the previous sampling time may be acquired through any other distance-measurement method or sensor. Upon the acquisition of the map about the first relative distances between the respective viewing points and the vehicle, it is able to calculate the first relative distances between the respective viewing points and the vehicle. The viewing field may be a monitoring range of a sensor, and the vehicle may include, but not limited to, a robot, an automobile and an unmanned aerial vehicle.

This step may further include, based on a binocular distance-measurement principle, acquiring, by a binocular camera device, the map about the first relative distances between the respective viewing points in the viewing field and the vehicle at the current sampling time and the previous sampling time in accordance with a vision disparity between two scenario images of an identical obstacle generated at an identical time as well as a structural parameter of the binocular camera device.

This step may further include, based on a monocular distance-measurement principle, performing, by a monocular camera device, geometrical conversion on an image at the current sampling time and an image at the previous sampling time, so as to acquire the scenario images at the current sampling time and the previous sampling time, and the map about the first relative distances between the respective viewing points in the viewing field and the vehicle.

This step may further include, based on a radar distance-measurement principle, scanning, by a radar scanning device, the obstacle in a radar scanning range, so as to acquire the scenario images at the current sampling time and the previous sampling time, and the map about the first relative distances between the respective viewing points in the viewing field and the vehicle.

It should be appreciated that, the above ways for acquiring the map about the first relative distances between the respective viewing points in the viewing field and the vehicle at the current sampling time and the previous sampling time are merely for illustrative purposes, and any other ways that are already known in the art or that may occur in future may also fall within the scope of the present disclosure and thus will be incorporated herein by reference.

Step S110: dividing and marking the obstacle in accordance with the map about the first relative distances at the current sampling time so as to acquire a profile and marking information of the obstacle, and weighted-averaging first distances within the profile so as to acquire a map about a second relative distance between the obstacle and the vehicle at the current sampling time.

The relative distance between an identical obstacle and the vehicle at an identical sampling time is a fixed value, so it is able to, in accordance with the map about the first relative distances, filter out information about a road surface and false obstacles, thereby to acquire the profile and the marking information of the obstacle, and the map about the second relative distance between the obstacle and the vehicle. Then, it is able to calculate the relative distance between the obstacle and the vehicle in accordance with the map about the second relative distance.

The step of dividing and marking the obstacle in accordance with the map about the first relative distances between the respective viewing points and the vehicle at the current sampling time so as to acquire the profile and the marking information of the obstacle may include: filtering out the map about the first relative distances at the current sampling time, so as to remove the road surface and the false obstacle; acquiring a second relative distance between the obstacle and the vehicle at the current sampling time in accordance with the map about the first relative distances at the current sampling time, and connecting the viewing points, distances between which and the vehicle are equal to the second relative distance, to form the profile of the obstacle; and marking the profile of the obstacle, and weighted-averaging the first relative distances in the profile so as to acquire the second relative distance between the obstacle and the vehicle, thereby to acquire the map about the second relative distance between the obstacle and the vehicle.

In addition, in accordance with the monocular distance-measurement principle, an imaging function of the camera may be trained on the basis of a template, so as to mark the feature point or identify a target through machine learning. A profile of the identified target may be directly extracted, and then the profile and a size of the stored template may be marked, so as to directly acquire the map about the second relative distance between the obstacle and the vehicle at the current sampling time.

Step S120: calculating a motion vector of the obstacle from the current sampling time to the previous sampling time using a motion estimation algorithm in accordance with the pair of scenario images at the current sampling time and the previous sampling time.

In this step, the imaging data at the current sampling time and the previous sampling time may be subjected to motion estimation operation, so as to acquire at the previous sampling time corresponding points or positions of the respective or some viewing points acquired at the current sampling time, i.e., to acquire the motion vector of each viewing point.

Through this step, it is able to calculate the motion vector from the obstacle in the map about the second relative distance at the current sampling time to the corresponding obstacle in the map about the second relative distance at the previous sampling time, i.e., to acquire a correspondence between the relative distances of the obstacle at the two sampling times (i.e., acquire depth information of the obstacle).

In a possible embodiment of the present disclosure, the motion estimation algorithm is a quick motion estimation algorithm such as block-matching.

This step may include: dividing each of the scenario image at the current sampling time and the scenario image at the previous sampling time into N blocks, where N is a positive integer; calculating a correspondence between the blocks in the scenario image at the current sampling time and the corresponding blocks in the scenario image at the previous sampling time using a quick block-matching algorithm or a frequency domain algorithm, so as to acquire a motion vector field of each block, or calculating a correspondence between critical points in the scenario image at the current sampling time and corresponding critical points in the scenario image at the previous sampling time, so as to acquire a motion vector of each critical point; and assigning or interpolating the motion vector field, so as to calculate the motion vector of each viewing point from the current sampling time to the previous sampling time.

In addition, in the case of calculating the motion vector field, any other spatial domain algorithm may also be used.

It should be appreciated that, the above-mentioned ways for calculating the motion vector of each viewing point from the current sampling time to the previous sampling time are merely for illustrative purposes, and any other ways that are already know in the art or that may occur in future may also fall within the scope of the present disclosure and will thus be incorporated herein by reference.

Step S130: matching the obstacle at the current sampling time with the corresponding marked obstacle at the previous sampling time in accordance with the profile and the marking information of the obstacle as well as the motion vector of the obstacle from the current sampling time to the previous sampling time, and calculating a map about a third relative distance between the corresponding obstacle and the vehicle at the previous sampling time in accordance with the profile of the obstacle at the previous sampling time and the map of the first relative distances at the previous sampling time.

Through the profile and the marking information of the obstacle as well as the motion vector of the obstacle from the current sampling time to the previous sampling time, it is able to acquire a correspondence between the obstacle at the current sampling time and the corresponding obstacle at the previous sampling time, and then acquire the map about the third relative distance between the obstacle and the vehicle at the previous sampling time.

In addition, in accordance with the monocular distance-measurement principle, an imaging function of the camera may be trained on the basis of a template, so as to mark the feature points or identify a target through machine learning. A profile of the identified target may be directly extracted, and then the profile and a size of the stored template may be marked, so as to directly acquire the map about the second relative distance between the obstacle and the vehicle at the current sampling time, and acquire the second relative distance between the obstacle and the vehicle at the previous sampling time in accordance with the map about the second relative distance.

Step S140: calculating a change value of the second relative distance of the obstacle at the current sampling time and the previous sampling time in accordance with the map about the second relative distance and the map about the third relative distance, and calculating a speed of the obstacle relative to the vehicle at the current sampling time in accordance with the change value of the second relative distance and an interval between the current sampling time and the previous sampling time.

In this step, a difference between the pieces of depth information about the same obstacle at the two sampling times is divided by the sampling interval, so as to acquire the speed of the obstacle relative to the vehicle.

To be specific, it is able to acquire the change value of the second relative distance from the current sampling time to the previous sampling time in accordance with the second relative distance between the obstacle and the vehicle at the current sampling time and the second relative distance between the obstacle and the vehicle at the previous sampling time, and then it is able to calculate the speed of the obstacle relative to the vehicle in accordance with the change value of the second relative distance and the interval between the current sampling time and the previous sampling time.

Step S150: determining a collision time when the obstacle acquired at the current sampling time is to collide with the vehicle in accordance with the map about the second relative distance between the obstacle and the vehicle at the current sampling time, the profile of the obstacle and the speed of the obstacle relative to the vehicle.

This step may include: weighted-averaging second distance values in the profile in accordance with the map of the second relative distance between the obstacle and the vehicle at the current sampling time and the profile of the obstacle, so as to acquire the second relative distance between the obstacle and the vehicle at the current sampling time; and dividing the second relative distance between the obstacle and the vehicle at the current sampling time by the speed of the obstacle relative to the vehicle at the current sampling time, so as to acquire the collision time when the obstacle acquired at the current sampling time is to collide with the vehicle.

As shown in FIG. 2, which is another flow chart of the obstacle warning method, the obstacle warning method may include the following steps.

Step S101: acquiring depth information about each viewing point in the viewing field at the current sampling time by, but not limited to, a binocular vision distance-measurement camera or a radar distance-measurement sensor.

To be specific, an image or other sensor information may be acquired at the current sampling time by the binocular vision distance-measurement or radar distance-measurement sensor, and then the depth information about each viewing point in the viewing field at the current sampling time may be calculated by a calculator built in a system in accordance with the image or the other sensor information. The depth information may include the relative distance between each viewing point and the vehicle.

Step S102: dividing and marking, by a Digital Signal Processor (DSP) image processing module built in the system, the obstacle in accordance with the depth information about each viewing point in the viewing field at the current sampling time.

In Step S102, the obstacle may be divided and marked in accordance with the depth information about each viewing point in the viewing field at the current sampling time, so as to filter out the road and false obstacles, thereby to acquire the profile of the obstacle, the relative distance between the obstacle and the vehicle, and a division map of the obstacle in the viewing field at the current sampling time.

In addition, in Step S101, the image or the other sensor information may be acquired by the binocular vision distance-measurement camera and the radar distance-measurement sensor at the previous sampling time.

Step S103: calculating the motion vector of the obstacle in accordance with the images acquired at the current sampling time and the previous sampling time, so as to acquire a correspondence between the pieces of depth information about the obstacle at the two sampling times.

In Step S103, the correspondence between the pieces of depth information about the obstacle at the two sampling times may be acquired by the calculator built in the system, and the depth information is just the relative distance.

Step S104: acquiring the speed of the obstacle relative to the vehicle in accordance with a change value of a depth of the obstacle at the two sampling times and a sampling interval. In this step, the relative speed may be calculated by the calculator built in the system.

Step S105: determining a collision time when the obstacle is to collide with the vehicle in accordance with the depth information about the obstacle ad the speed of the obstacle relative to the vehicle at the current sampling time. In this step, the collision time when the obstacle is to collide with the vehicle may be calculated by the calculator built in the system.

Step S106: determining a relative distance between the obstacle and the vehicle and a position of the obstacle at a next sampling time in accordance with the relative distance between the obstacle and the vehicle, a speed of the obstacle relative to the vehicle and the motion vector at the current sampling time.

Further, the step of acquiring the relative distance between each viewing point and the vehicle at the current sampling time through the vision distance-measurement principle or by any other sensor may include, but not limited to: based on a binocular distance-measurement principle, acquiring, by the binocular camera device, the depth information about each viewing point in the viewing field in accordance with a vision disparity between two scenario images of an identical obstacle generated at an identical time as well as a structural parameter of the binocular camera device, i.e., acquiring the first distances between the respective viewing points in the viewing field and the vehicle; or based on a radar distance-measurement principle, scanning, by a radar sensor, the obstacle in a radar scanning range, so as to acquire the depth information about each viewing point in the viewing field.

Further, the step of acquiring the profile and the marking information of the obstacle in accordance with the map about the depth information at the current sampling time may include, but not limited to: filtering out the depth information so as to remove the road surface and the false obstacles; connecting the viewing points having an identical depth value to form the profile; and marking the profile and the depth value, so as to divide the obstacle.

Further, the step of subjecting the imaging data acquired at the current sampling time and the previous sampling time to motion estimation operation so as to acquire the motion vector of each viewing point may include, but not limited to: calculating, by a computing device, a correspondence between corresponding blocks in the images acquired at the two sampling times, using a spatial-domain algorithm such as a quick block-matching algorithm, so as to acquire a motion vector field of each block; and assigning or interpolating the motion vector field so as to acquire the motion vector field at the sampling times.

Further, the step of calculating the speed of the obstacle relative to the vehicle may include, but not limited to: acquiring a correspondence between the obstacle in the map about the depth information at the current sampling time and the corresponding obstacle in the map about the depth information at the previous sampling time in accordance with the marking information and the motion vector of the obstacle, so as to acquire the depth information about the obstacle at the two sampling times; and dividing a difference between the pieces of depth information about the same obstacle at the two sampling times by a sampling interval, so as to acquire the speed of the obstacle relative to the vehicle.

Further, the step of determining the collision time when the obstacle is to collide with the vehicle may include dividing the relative distance between the obstacle and the vehicle at the current sampling time, i.e., the depth of the obstacle, by the speed of the obstacle relative to the vehicle, so as to determine the collision time when the obstacle is to collide with the vehicle.

Further, the step of determining the position of the obstacle and the relative distance between the obstacle and the vehicle at the next sampling time may include: determining the position of the obstacle at the next sampling time in accordance with the motion vector of the obstacle at the current sampling time; and determining the relative distance between the obstacle and the vehicle at the next sampling time in accordance with the relative distance between the obstacle and the vehicle and the speed of the obstacle relative to the vehicle at the current sampling time as well as the sampling interval.

Figure 3:
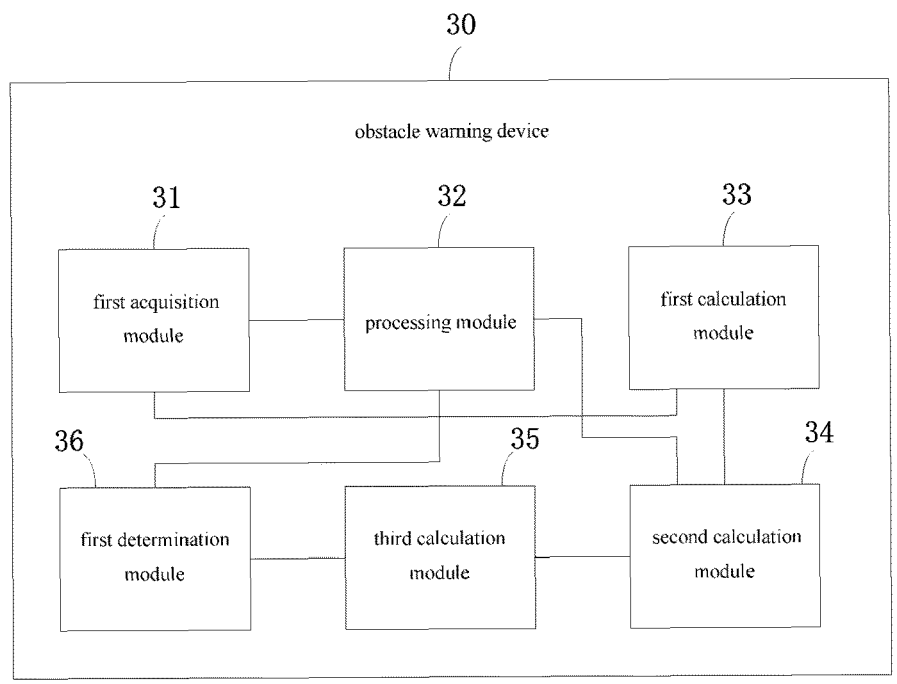
FIG. 3 is a schematic view showing an obstacle warning device according to one embodiment of the present disclosure.

Based on an identical inventive concept, the present disclosure further provides in some embodiments an obstacle warning device for an obstacle avoidance and path planning system of a vehicle. As shown in FIG. 3, the obstacle warning device 30 at least includes a first acquisition module 31, a processing module 32, a first calculation module 33, a second calculation module 34, a third calculation module 35 and a first determination module 36. The acquisition module 31 is configured to acquire a first scenario image at a current sampling time, a second scenario image at a previous sampling time, and a map about first relative distances between respective viewing points in a viewing field and the vehicle. The processing module 32 is configured to divide and mark an obstacle in the first scenario image in accordance with the map about the first relative distances so as to acquire a profile and marking information of the obstacle, and weighted-average first distances in the profile so as to acquire a map about a second relative distance between the obstacle and the vehicle. The first calculation module 33 is configured to calculate a motion vector of the obstacle from the current sampling time to the previous sampling time in accordance with the first scenario image and the second scenario image. The second calculation module 34 is configured to match the marked obstacle acquired at the current sampling time with the corresponding obstacle acquired at the previous sampling time in accordance with the profile, the marking information and the motion vector, and calculate a map about a third relative distance between the obstacle and the vehicle at the previous sampling time in accordance with the profile of the obstacle at the previous sampling time and the map about the first relative distances between the respective viewing points and the vehicle at the previous sampling time. The third calculation module 35 is configured to calculate a change value of a relative distance between the obstacle and the vehicle at the current sampling time and the previous sampling time in accordance with the map about the second relative distance and the map about the third relative distance, and calculate a speed of the obstacle relative to the vehicle at the current sampling time in accordance with the change value of the relative distance and an interval between the current sampling time and the previous sampling time. The first determination module 36 is configured to determine a collision time when the obstacle acquired at the current sampling time is to collide with the vehicle in accordance with the map about the second relative distance, the profile of the obstacle and the speed of the obstacle relative to the vehicle.

In a possible embodiment of the present disclosure, the first acquisition module may include a first acquisition sub-module, a second acquisition sub-module or a third acquisition sub-module. The first acquisition sub-module is configured to, based on a binocular distance-measurement principle, acquire the first scenario image, the second scenario image and the map about the first relative distances between the respective viewing points in the viewing field and the vehicle in accordance with a vision disparity between two scenario images of the obstacle generated at an identical time as well as a structural parameter of a binocular camera device. The second acquisition sub-module is configured to, based on a monocular distance-measurement principle, perform geometrical conversion on an image at the current sampling time and an image at the previous sampling time, so as to acquire the first scenario image and the second scenario image at the current sampling, and the map about the first relative distances between the respective viewing points in the viewing field and the vehicle. The third acquisition sub-module is configured to, based on a radar distance-measurement principle, scan the obstacle in a radar scanning range, so as to acquire the first scenario image and the second scenario image at the current sampling time and the previous sampling time, and the map about the first relative distances between the respective viewing points in the viewing field and the vehicle.

Based on the above, the second calculation module may include a second acquisition module configured to, based on the monocular distance-measurement principle, train an imaging function of the camera on the basis of a template, so as to mark a feature point or identify a target through machine learning; directly extract a profile of the identified target; and mark the profile and a size of the stored template, so as to directly acquire the map about the second relative distance between the obstacle and the vehicle at the current sampling time.

Based on the above, the processing module may include a filtration module, a combination module and a processing sub-module. The filtration module is configured to filter out the map about the first relative distances at the current sampling time, so as to remove a road surface and a false obstacle. The combination module is configured to acquire a second relative distance between the obstacle and the vehicle at the current sampling time in accordance with the map about the first relative distances, and connect the viewing points, distances between which and the vehicle are equal to the second relative distance, to form the profile of the obstacle. The processing sub-module is configured to mark the profile and the second relative distance between the obstacle and the vehicle.

Based on the above, the first calculation module may include a division module, a first calculation sub-module or a second calculation sub-module, and a third calculation sub-module. The division module is configured to divide each of the first scenario image at the current sampling time and the second scenario image at the previous sampling time into N blocks, where N is a positive integer. The first calculation sub-module is configured to calculate a correspondence between each block in the first scenario image at the current sampling time and the corresponding block in the second scenario image at the previous sampling time using a quick block-matching algorithm or a frequency-domain algorithm, so as to acquire a motion vector field of each block. The second calculation sub-module is configured to calculate a correspondence between a critical point in the first scenario image at the current sampling time and the corresponding critical point in the second scenario image at the previous sampling time using an optical flow algorithm or the frequency-domain algorithm, so as to acquire a motion vector field of the critical point. The third calculation sub-module is configured to assign or interpolate the motion vector field, so as to calculate the motion vector of the obstacle from the current sampling time to the previous sampling time.

The third calculation module may include a fourth calculation sub-module configured to divide the change value of the second relative distance by the interval between the current sampling time and the previous sampling time, so as to acquire the speed of the obstacle relative to the vehicle at the current sampling time.

The first determination module may include a third acquisition sub-module and a fifth calculation sub-module. The third acquisition sub-module is configured to weighted-average second distances in the profile in accordance with the map about the second relative distance between the obstacle and the vehicle at the current sampling time and the profile of the obstacle, so as to acquire a second relative distance between the obstacle and the vehicle at the current sampling time. The fifth calculation sub-module is configured to divide the second relative distance between the obstacle and the vehicle at the current sampling time by the speed of the obstacle relative to the vehicle at the current sampling time, so as to acquire the collision time when the obstacle acquired at the current sampling time is to collide with the vehicle.

Figure 4:
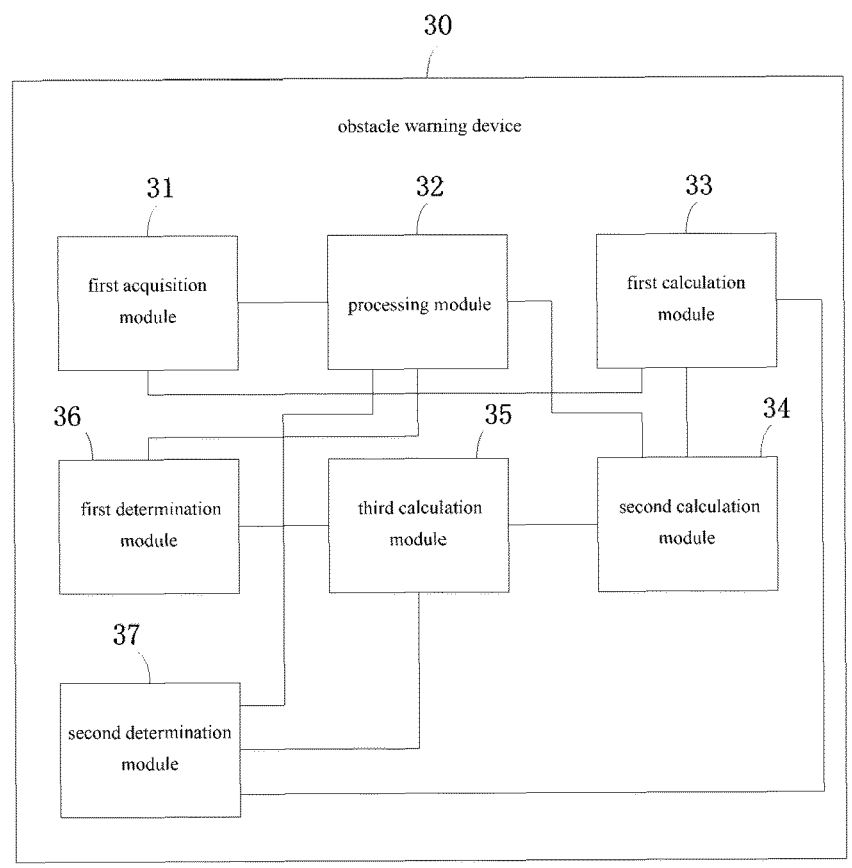
FIG. 4 is another schematic view showing the obstacle warning device according to one embodiment of the present disclosure.

Based on the above, as shown in FIG.4, the obstacle warning device may further include a second determination module 37 configured to determine a position of the obstacle and a relative distance between the obstacle and the vehicle at a next sampling time in accordance with the map about the second relative distance between the obstacle and the vehicle at the current sampling time, the profile of the obstacle, the speed of the obstacle relative to the vehicle, and the motion vector of the obstacle from the current sampling time to the previous sampling time.

In a possible embodiment of the present disclosure, the second determination module may include a weighted-averaging module, a first determination sub-module and a second determination sub-module. The weighted-averaging module is configured to weighted-average motion vectors of the obstacle from the current sampling time to the previous sampling time, so as to acquire the motion vector of the obstacle from the current sampling time to the previous sampling time. The first determination sub-module is configured to determine the position of the obstacle at the next sampling time in accordance with the motion vector of the obstacle from the current sampling time to the previous sampling time. The second determination sub-module is configured to determine the relative distance between the obstacle and the vehicle at the next sampling time in accordance with the map about the second relative distance between the obstacle and the vehicle at the current sampling time, the speed of the obstacle relative to the vehicle, and the interval between the current sampling time and the previous sampling time.

It should be further appreciated that, in the case of detecting the obstacle, the disparity map-based obstacle detection device has been illustrated hereinabove merely on the basis of the above functional modules. During the actual application, the above-mentioned functions may be achieved by different functional modules according to the practical need, i.e., the disparity map-based obstacle detection device may include different functional modules, so as to achieve all of or parts of the above-mentioned functions.

It should be further appreciated that, although the device and the method in the embodiments of the present disclosure have been separately described hereinbefore, details in the embodiments about the device may also be applied to the embodiments about the method. Names of the modules or steps involved in the embodiments of the present disclosure are merely provided to differentiate the modules or steps, but shall not be construed as limiting the scope of the present disclosure. It should be further appreciated that, the modules or steps involved in the embodiments of the present disclosure may be further divided or combined. For example, the above-mentioned modules may be combined into one module, or further divided into more sub-modules.

Although with the above-mentioned descriptions, it should be appreciated that, a person skilled in the art may make various modifications, substitutions or improvements without departing from the spirit of the present disclosure, and these modifications, substitutions or improvements shall also fall within the scope of the present disclosure.

The invention claimed is:

1. An obstacle warning method for an obstacle avoidance and path planning system of a vehicle, at least comprising steps of:

acquiring a first scenario image at a current sampling time, a second scenario image at a previous sampling time, and a map about first relative distances between respective viewing points in a viewing field and the vehicle;

dividing and marking an obstacle in the first scenario image in accordance with the map about the first relative distances so as to acquire a profile and marking information of the obstacle, and weighted-averaging first distances in the profile so as to acquire a map about a second relative distance between the obstacle and the vehicle;

calculating a motion vector of the obstacle from the current sampling time to the previous sampling time in accordance with the first scenario image and the second scenario image;

matching the marked obstacle acquired at the current sampling time with the corresponding obstacle acquired at the previous sampling time in accordance with the profile, the marking information and the motion vector, and calculating a map about a third relative distance between the obstacle and the vehicle at the previous sampling time in accordance with the profile of the obstacle at the previous sampling time and the map about the first relative distances between the respective viewing points and the vehicle at the previous sampling time;

calculating a change value of a relative distance between the obstacle and the vehicle at the current sampling time and the previous sampling time in accordance with the map about the second relative distance and the map about the third relative distance, and calculating a speed of the obstacle relative to the vehicle at the current sampling time in accordance with the change value of the relative distance and an interval between the current sampling time and the previous sampling time; and determining a collision time when the obstacle acquired at the current sampling time is to collide with the vehicle in accordance with the map about the second relative distance, the profile of the obstacle and the speed of the obstacle relative to the vehicle, and sending an obstacle warning in accordance with the collision time.

2. The obstacle warning method according to claim 1, wherein the step of acquiring the first scenario image at the current sampling time, the second scenario image at the previous sampling time, and the map about the first relative distances between respective viewing points in the viewing field and the vehicle comprises:

based on a binocular distance-measurement principle, acquiring, by a binocular camera device, the first scenario image, the second scenario image and the map about the first relative distances between the respective viewing points in the viewing field and the vehicle in accordance with a vision disparity between two scenario images of the obstacle generated at an identical time as well as a structural parameter of the binocular camera device; or based on a monocular distance-measurement principle, performing, by a monocular camera device, geometrical conversion on an image at the current sampling time and an image at the previous sampling time, so as to acquire the first scenario image and the second scenario image at the current sampling, and the map about the first relative distances between the respective viewing points in the viewing field and the vehicle; or based on a radar distance-measurement principle, scanning, by a radar scanning device, the obstacle in a radar scanning range, so as to acquire the first scenario image and the second scenario image at the current sampling time and the previous sampling time, and the map about the first relative distances between the respective viewing points in the viewing field and the vehicle.

3. The obstacle warning method according to claim 1, wherein the step of acquiring the map about the second relative distance between the obstacle and the vehicle at the current sampling time comprises: based on the monocular distance-measurement principle, training an imaging function of the camera on the basis of a template, so as to mark a feature point or identify a target through machine learning; directly extracting a profile of the identified target; and marking the profile and a size of the stored template, so as to directly acquire the map about the second relative distance between the obstacle and the vehicle at the current sampling time.

4. The obstacle warning method according to claim 1, wherein the step of dividing and marking the obstacle in the first scenario image in accordance with the map about the first relative distances so as to acquire the profile and marking information of the obstacle, and weighted-averaging the first distances in the profile so as to acquire the map about the second relative distance between the obstacle and the vehicle comprises:

filtering out the map about the first relative distances at the current sampling time, so as to remove a road surface and a false obstacle;

acquiring a second relative distance between the obstacle and the vehicle at the current sampling time in accordance with the map about the first relative distances, and connecting the viewing points, distances between which and the vehicle are equal to the second relative distance, to form the profile; and marking the profile, and weighted-averaging the first relative distances in the profile to mark the second relative distance between the obstacle and the vehicle.

5. The obstacle warning method according to claim 1, wherein the step of calculating the motion vector of the obstacle from the current sampling time to the previous sampling time comprises:

dividing each of the first scenario image at the current sampling time and the second scenario image at the previous sampling time into N blocks, N being a positive integer;

calculating a correspondence between each block in the first scenario image at the current sampling time and the corresponding block in the second scenario image at the previous sampling time using a quick block-matching algorithm or a frequency-domain algorithm, so as to acquire a motion vector field of each block, or calculating a correspondence between a critical point in the first scenario image at the current sampling time and a corresponding critical point in the second scenario image at the previous sampling time using an optical flow algorithm or the frequency-domain algorithm, so as to acquire a motion vector field of the critical point; and assigning or interpolating the motion vector field, so as to calculate the motion vector of the obstacle from the current sampling time to the previous sampling time.

6. The obstacle warning method according to claim 1, wherein the step of calculating the speed of the obstacle relative to the vehicle at the current sampling time in accordance with the change value of the relative distance and the interval between the current sampling time and the previous sampling time comprises:

dividing the change value of the second relative distance by the interval between the current sampling time and the previous sampling time, so as to acquire the speed of the obstacle relative to the vehicle at the current sampling time.

7. The obstacle warning method according to claim 1, wherein the step of determining the collision time when the obstacle acquired at the current sampling time is to collide with the vehicle in accordance with the map about the second relative distance, the profile of the obstacle and the speed of the obstacle relative to the vehicle comprises:

weighted-averaging second distances in the profile in accordance with the map about the second relative distance between the obstacle and the vehicle at the current sampling time and the profile of the obstacle, so as to acquire a second relative distance between the obstacle and the vehicle at the current sampling time; and dividing the second relative distance between the obstacle and the vehicle at the current sampling time by the speed of the obstacle relative to the vehicle at the current sampling time, so as to acquire the collision time when the obstacle acquired at the current sampling time is to collide with the vehicle.

8. The obstacle warning method according to claim 1, further comprising:

determining a position of the obstacle and a relative distance between the obstacle and the vehicle at a next sampling time in accordance with the map about the second relative distance between the obstacle and the vehicle at the current sampling time, the profile of the obstacle, the speed of the obstacle relative to the vehicle, and the motion vector of the obstacle from the current sampling time to the previous sampling time.

9. The obstacle warning method according to claim 7, wherein the step of determining the position of the obstacle and the relative distance between the obstacle and the vehicle at the next sampling time comprises:

weighted-averaging motion vectors of the obstacle from the current sampling time to the previous sampling time, so as to acquire the motion vector of the obstacle from the current sampling time to the previous sampling time;

determining the position of the obstacle at the next sampling time in accordance with the motion vector of the obstacle from the current sampling time to the previous sampling time; and determining the relative distance between the obstacle and the vehicle at the next sampling time in accordance with the map about the second relative distance between the obstacle and the vehicle at the current sampling time, the speed of the obstacle relative to the vehicle, and the interval between the current sampling time and the previous sampling time.

* * * * *